United States Patent [19]

Sujeeth

[11] Patent Number: 5,772,696
[45] Date of Patent: Jun. 30, 1998

[54] PROCESS FOR PURIFICATION OF WATER SOLUBLE DYES VIA WATER INSOLUBLE METAL SALT INTERMEDIATE

[75] Inventor: Puthalath Koroth Sujeeth, Maryland Heights, Mo.

[73] Assignee: Warner-Jenkinson Company, Inc., St. Louis, Mo.

[21] Appl. No.: 764,317

[22] Filed: Dec. 12, 1996

[51] Int. Cl.$^6$ .................................................. C09B 67/34
[52] U.S. Cl. ..................... 8/440; 8/588; 8/589; 8/618; 8/620; 8/625; 8/628; 8/614; 8/662; 8/938
[58] Field of Search .............................. 8/618, 625, 628, 8/936, 938, 588, 589, 438, 440; 426/262, 267

[56] References Cited

U.S. PATENT DOCUMENTS

| | | | |
|---|---|---|---|
| 256,599 | 4/1882 | Rudolph | 546/173 |
| 290,585 | 12/1883 | Jacobsen | 546/173 |
| 890,588 | 6/1908 | Meyer | 546/172 |
| 2,092,238 | 9/1937 | Bailey | 260/38 |
| 2,211,662 | 8/1940 | Kyrides | 260/283 |
| 3,108,109 | 10/1963 | Clarke | 260/289 |
| 4,290,812 | 9/1981 | Loock | 106/22 |
| 4,398,916 | 8/1983 | Ambrosiano et al. | 8/602 |
| 4,668,789 | 5/1987 | Bermes | 546/101 |
| 4,684,453 | 8/1987 | Vaughan | 204/182.4 |

*Primary Examiner*—Margaret Einsmann
*Attorney, Agent, or Firm*—Whyte Hirschboeck Dudek S.C.

[57] ABSTRACT

An invention is disclosed which pertains to a method for purifying water soluble dyes, such as quinoline, fluoran, and xanthene dyes. The method comprises the steps of A) adding a metal salt to the water soluble dye to form a water insoluble dye salt of the metal; B) isolating the water insoluble dye salt of step A; C) converting the water insoluble dye salt of step B into a water soluble dye solution; and D) isolating the water soluble dye from the solution of step C. The present invention teaches a straight forward, economical, and environmentally sound method for purifying water soluble dyes of FDA certifiable purity and with an aesthetically improved shade.

29 Claims, No Drawings

PROCESS FOR PURIFICATION OF WATER SOLUBLE DYES VIA WATER INSOLUBLE METAL SALT INTERMEDIATE

This application claims the benefit of U.S. Provisional application Ser. No.: 60/008,553, filed Dec. 13, 1995.

BACKGROUND

This invention pertains to a method for purifying water soluble dyes. In particular, this invention pertains to a method for purifying water soluble dyes such as quinoline, fluoran, and xanthene dyes.

Certified dyes are regulated by the Food and Drug Administration (FDA) for use in food, drug, and cosmetic applications. High dye purity is essential in order to obtain FDA approval and certification. Yet, for some shade critical applications, dyes having even higher purity are needed. Many of these certifiable dyes possess commercial importance.

Certified quinoline dyes include predominantly monosulfonated dyes such as D & C (Drug & Cosmetic) Yellow No. 10, also known as Acid Yellow 3, and disulfonated dyes such as E104 or C.I. Food Yellow 13, also known as Quinoline Yellow. "D & C Y10," is described in the Merck Index as "a mixture of the sodium salts of the mono- and disulfonic acids of quinoline yellow spirit soluble." Principal constituents are: sodium salts of 2-(2'-quinolyl)-1,3-indandione-6'-sulfonic acid (64%) [FIG. I where $R_1=SO_3H$; $R_2 \ldots R_8=H$] and 2-(2'-quinolyl)-1,3-indandione-8'-sulfonic acid (22%) [FIG. I where $R_2=SO_3H$; $R_1,R_3 \ldots R_8=H$]. "Studies in Coal-tar Colors. XXV. D & C Yellow No. 10", Ritchie et. al., J.A.O.A.C., 44,(1961).

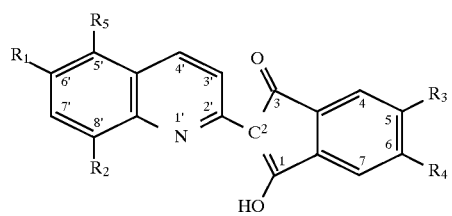

Certified fluoran dyes include D & C Orange No. 5, also known as Dibromofluorescein or C.I. Solvent Red 72, D & C Orange No. 10, also known as Diiodofluoresein, D & C Red No. 21, also known as tetrabromofluorescein or C.I. Solvent Red 43, D & C Red No.27, also known as Terabromotetrachlorofluorescein or C.I. Solvent Red 48, and D & C Yellow No. 7, also known as Fluorescein or C.I. Solvent Yellow 94.

Certified xanthene dyes include FD & C (Food, Drug, & Cosmetic) Red No. 3, also known as Erythrosine or C.I. Food Red 14, D & C Orange No. 11, also known as Erythrosine Yellowish Na or C.I. Acid Red 95, D & C Red No. 22, also known as Eosin Y or C.I. Acid Red 87, D & C Red No. 28, also known as Phioxine B or C.I. Acid Red 92, and D & C Yellow No. 8, also known as Uranine or C.I. Acid Yellow 73.

Both fluoran (FIG. II) and xanthene (FIG. III) dyes share a common structural skeleton, that of fluorescein (D & C Yellow No.7; II where $R_1 \ldots R_8=H$). The structures and CAS Registry Numbers of the individual compounds described here are listed in the glossary found in the detailed description of the invention which follows. In the acid form (as fluorans as in D & C Orange No.5, D & C Orange No.10, D & C Red No. 21, D & C Red No.27, and D & C Yellow No.7) they are water insoluble and exist predominantly in the lactone form (FIG. II). They differ amongst themselves by the particular halogen (bromine, chlorine or iodine) substituent or the degree of substitution (di or tetra halogenated). They are rendered water soluble by conversion to the disodium salt when they exist as quinanoid xanthenes (FIG. III) as in FD & C Red No. 3, D & C Orange No. 11, D & C Red No. 22, D & C Red No. 28, and D & C Yellow No. 8. The purification of fluorans is usually accomplished by conversion to the corresponding water soluble xanthenes. The water insoluble metal salts of xanthene dyes render themselves useful as intermediates in such purification by virtue of the solubility of the corresponding salts of process intermediates.

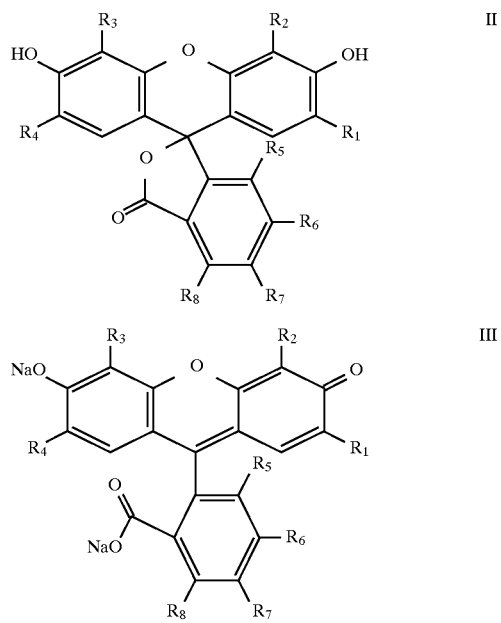

One method for purifying water soluble sulfonated dyes such as quinoline dyes involves drowning in brine solution, neutralizing, and then salting out the resultant sodium salts of the mixture of sulfonation products. The product, technical Quinoline Yellow, is collected by filtration. However, the salting out method presents difficulty in that the product is grossly contaminated with both sodium chloride and sodium sulfate and contains other sulfonated by-products such as sulfonated phthalic acid and sulfonated quinaldine. The product thus obtained is unsatisfactory for certification and requires considerable purification to remove the organic and inorganic (in order to bring the color content to the required level) impurities. Such rework involves copious water or dilute brine washings to remove most of the inorganic salts. The purification steps are further complicated by the product becoming gelatinous and difficult to filter. Since the product is water soluble, considerable yield loss is also experienced. Therefore, it is difficult and costly to remove the contaminants, particularly the water soluble contaminants, in order to bring the product within the currently required specifications for certification of the dyestuff as a D & C color additive. U.S. Pat. Nos. 4,398,916; 3,108,109; 2,211,662; 2,092,238; 890,588; and 256,599 all disclose the use of sodium chloride to salt out sulfonated quinoline dyes as discussed above and are incorporated herein by reference.

U.S. Pat. No. 290,585 by Jacobsen, incorporated herein by reference, teaches the isolation of sulfonated quinoline dyes as the corresponding water soluble calcium salt using calcium hydroxide. The water soluble calcium dye salt is separated from the insoluble calcium sulfate by filtration. The water soluble calcium dye salt is then recovered along with soluble impurities as a solid by removing the water solvent through evaporation. The process taught by the '585 patent removes only the inorganic sulfate by-products leaving almost all other by-products, including higher sulfonated subsidiary dyes, admixed with the desired product. This procedure is also limited to those dye species such as disulfonated quinoline yellow which form a soluble calcium salt.

Although D & C Y10 of adequate purity may be produced by the application of prior art, dyes thus produced exhibit a darker brown-yellow shade. The need for obtaining a bright yellow D & C Y10 product was recognized by Ambrosiano et. al as disclosed in U.S. Pat. No. 4,398,916, which is incorporated herein by reference. The '916 patent claims a process for producing bright yellow quinoline dye through the formation of an insoluble amine dye salt intermediate. As taught by the '916 patent, a stoichiometric amount of an aqueous addition salt of an organic amine is added to an aqueous solution of quinoline yellow dye to form an insoluble amine dye salt. The insoluble amine dye salt is separated and washed with a lower alkanol or an aqueous solution thereof to remove the impurities. The washed amine salt is dissolved in a dilute aqueous solution of sodium hydroxide to convert the dye to a sodium salt. The liberated amine must then be removed from the aqueous dye solution. The dye is finally recovered as a solid by removing the water solvent through evaporation.

Similar to the '916 patent above, U.S. Pat. No. 4,290,812 teaches a process for purifying water soluble dyes through the formation of an insoluble amine salt. U.S. Pat. No. 4,668,789 discloses a process for purifying quinoline dyes through the formation of a soluble amine dye salt intermediate which must be subjected to numerous liquid extractions in order to remove impurities and recover the dyestuffs.

The above described processes involve many steps and allow the product to be contaminated with new organic amine impurities. The product of these processes will have to be totally free of the newly introduced impurities before it can be certified and used for Drug and Cosmetic applications. Known methods for purifying water soluble dyes of FDA certifiable purity and possessing bright shade characteristics involve many process steps, generate solvent wastes, and are less economical. Thus, the need exists for a straight forward, economical, and environmentally sound method for purifying water soluble dyes of FDA certifiable purity and with an aesthetically improved shade.

SUMMARY OF THE INVENTION

The present invention provides a method for purifying a water soluble dye comprising the steps of:

A. adding a metal salt to the dye to form a water insoluble dye salt of the metal;

B. isolating the water insoluble dye salt of step A;

C. converting the water insoluble dye salt of step B into a water soluble dye solution; and D. isolating the water soluble dye from the solution of step C.

The present invention also provides a method for purifying a predominantly monosulfonated species of water soluble dye comprising the steps of:

A. adding a calcium salt to the dye to form an insoluble monosulfonated calcium dye salt;

B. isolating the insoluble monsulfonated calcium dye salt of step A;

C. converting the insoluble monosulfonated calcium dye salt of step B into a soluble monosulfonated dye solution; and D. isolating the soluble monosulfonated dye from the solution of step C.

The present invention also includes a method for purifying a water insoluble fluoran dye comprising the steps of:

A. adding a suitable base to the dye to obtain a solution in water;

B. adding a metal salt to the dye solution to form an insoluble dye solution;

C. isolating the insoluble dye solution of step B;

D. converting the insoluble purified dye solution of step C into a soluble dye solution; and E. isolating the water insoluble fluoran dye after precipitation with a suitable acid.

The present invention also envisages the conversion of the purified water soluble dye to a water insoluble, acid form of the dye as in the conversion of xanthenes (II) to fluorans (I).

DETAILED DESCRIPTION OF THE INVENTION

Glossary 2-(2'-quinolyl)-1,3-indandione-6'-sulfonic acid
($R_1 = SO_3H$: $R_2$, $R_3$, $R_4$, $R_5 = H$)
[CAS 38615-45-1/83440-71-5]
[Sodium Salt CAS 82678-10-2]

2-(2'-quinolyl)-1,3-indandione-8'-sulfonic acid
($R_2 = SO_3H$; $R_1$, $R_3$, $R_4$, $R_5 = H$)
[CAS 83440-72-6]
[Sodium Salt CAS 82678-11-3]

2-(2'-quinolyl)-1,3-indandione-5,6'-disulfonic acid
($R_1$, $R_3 = SO_3H$; $R_2$, $R_4$, $R_5 = H$)
[CAS 38615-46-2/83440-68-0]
Disodium Salt [CAS 82678-14-6]

2-(2'-quinolyl)-1,3-indandione-5',8'-disulfonic acid
($R_2$, $R_5$, $= SO_3H$: $R_1$, $R_3$, $R_4 = H$)
Disodium Salt (CAS 82678-13-5]

2-(2'-quinolyl)-1,3-indandione-5,8'-disulfonic acid
($R_2$, $R_3 = SO_3H$: $R_1$, $R_4$, $R_5 = H$)
(CAS 83440-69-1]
Disodium Salt [CAS 82678-15-7]

2-(2'-quinolyl)-1,3-indandione-6',8'-disulfonic acid
($R_1$, $R_2 = SO_3H$; $R_3$, $R_4$, $R_5 = H$)
Disodium Salt [CAS 82678-12-4]

2-(2'-quinolyl)-1,3-indandione-5,6',8'-trisulfonic acid
($R_1$, $R_2$, $R_3 = SO_3H$: $R_4$, $R_5 = H$)
[CAS 83440-67-9]

Fluorescein or D&C Yellow No. 7
($R_1 \ldots R_8 = H$) CAS 2321-07-5
[Disodium Salt or Uranine or D&C Yellow No. 8
CAS 518-47-8]

Erythrosine or FD&C Red No. 3
($R_1 \ldots R_4 = I$; $R_5 \ldots R_8 = $ disodium
salt; CAS 16423-68-0]

Dibromofluorescein or D&C Orange No. 5
($R_2$, $R_3 = Br$; $R_1$, $R_4 \ldots R_8 = H$) CAS 596-03-2

Diodofluorescein or D&C Orange No. 10
($R_2$, $R_3 = I$; $R_1$, $R_4 \ldots R_8 = H$) CAS 38577-97-8
[Disodium salt or D&C Orange No. 11
CAS 33239-19-9]

Tetrabromofluorescein or D&C Red No. 21

-continued (R$_1$ ... R$_4$ = Br; R$_5$ ... R$_8$ = H) CAS 15086-94-9
[Disodium salt or Eosin Y or D&C Red No. 22
CAS 17372-87-1]

Tetrabromotetrachlorofluorescein or D&C Red No. 27
(R$_1$ ... R$_4$ = Br, R$_5$ ... R$_8$ = Cl) CAS 13473-26-2
[Disodium salt or Phloxine B or D&C Red No. 28
CAS 18472-87-2]

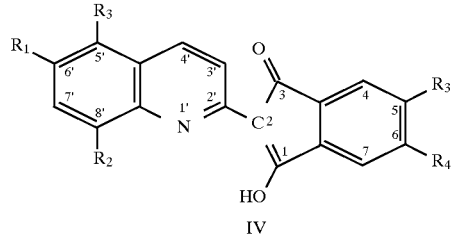

IV

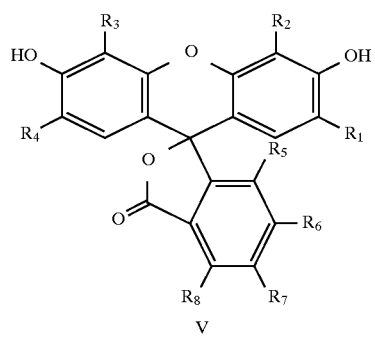

V

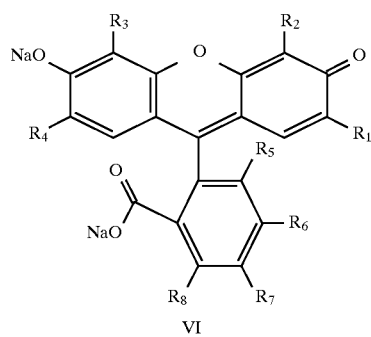

VI

D & C Y10 is permitted for use by FDA only for Drug and Cosmetic applications. As stated above, D & C Y10 is a mixture of the sodium salts of the mono- and disulfonic acids of quinoline yellow. Small amounts of 2-(2'-quinolyl) -1,3-indandione-5,6'-disulfonic acid (9%) [III where R$_1$,R$_3$= SO$_3$H; R$_2$,R$_4$. . . R$_8$=H], 2-(2'-quinolyl)-1,3-indandione-5, 8'-disulfonic acid (4%) [III where R$_2$,R$_3$=SO$_3$H; R$_1$,R$_4$. . . R$_{8=H}$] and 2-(2'-quinolyl)-1,3-indandione-6',8'-sulfonic acid (1%) [III where R$_1$,R$_2$=SO$_3$H; R$_3$. . . R$_8$=H] are present in all commercial samples. The maximum amount of the sum of all disulfonic acid salts is regulated by the FDA to be below 15% of the total dye. In addition, only trace amounts of trisulfonic acid (2-(2'-quinolyl)-1,3-indandione-5,6',8'-trisulfonic acid [III where R$_1$,R$_2$,R$_3$ =SO$_3$H; R$_4$. . . R$_8$=H] ) are allowed to be present along with sulfonated intermediates such as sulfophthalic acid, quinaldine sulfonic acid (both <0.2% each), unsulfonated 2-(2'-quinolyl)-1,3-indandione [I where R$_1$. . . R$_8$=H]. (<4 ppm) and diethyl ether soluble matter other than specified (<2 ppm). As used in the present invention, "predominantly monosulfonated dye species" refers to those dye mixtures containing more than 85 percent wt/wt of monosulfonated dye species. End user requirements often stipulate further shade requirements beyond the scope of the above stated FDA regulations.

E104 which is comprised of predominantly (>50%) disodium salt of disulfonic acids of quinoline yellow spirit soluble is permitted for use only outside of the United States and is regulated by International Colorant Specifications stipulated by the European Economic Committee (E.E.C.), the Food and Agricultural Organization (F.A.O.) and the World Health Organization (W.H.O.). The E.E.C. stipulation previously required a minimum dye content of 70%, of which not less than 50% shall be the disulfonic acid salts and not more than 4% shall be the trisulfonic acid salt. However, since Jul. 1, 1996 the EEC has adopted the more stringent F.A.O. and W.H.O. specifications. The F.A.O. and W.H.O. requirements are more stringent in that the disulfonic acid salts have to be present not less than 80% while maintaining the trisulfonic acid level below 7%. As used in the present invention, "predominantly disulfonated dye species" refers to those dye mixtures containing more than 50 percent wt/wt of disulfonated dye species. Similar to D & C Y10, additional shade requirements exist for particular applications.

Any anionic dye that can form a water insoluble metal salt may be purified from the corresponding water soluble impurities or intermediates, including soluble metal dye salts, by this method. For example, while calcium salts of monosulfonated quinoline dyes are insoluble, the corresponding calcium salts of disulfonated quinoline dyes are soluble in water. These differences in solubility may be exploited to decrease or increase the level of disulfonated dyes present at will. Since the barium salts of disulfonated dyes differ in solubility (they are relatively insoluble), the disulfonated dyes can be purified from soluble reaction intermediates as in the case of monosulfonated dye species. Furthermore, the capacity to form insoluble metal salts is not limited to sulfonated dyes. For example, the xanthene dyes referred to above form metal salts by virtue of carboxylic and phenolic groups present.

The selection of the metal ion is not limited to calcium or barium salts. In general, higher valent metal salts are less soluble. For example, aluminum, iron and zirconium ions form insoluble salts of many dyes.

In general, the molar ratio of metal salt added to water soluble dye is preferably in the range from about one equivalent to about ten equivalents, more preferably from about one equivalent to about five equivalents, most preferably from about one equivalent to two equivalents. The formation of the insoluble metal dye salt intermediate occurs in the range of 0° C. to about 100° C., more preferably from about 20° C. to about 70° C., most preferably from about 35° C. to 60° C. Typically, about 98% of the total theoretical amount of the insoluble dye salt intermediate is produced between zero hours and ten hours.

The insoluble metal dye salt intermediate produced may be isolated from the soluble impurities by filtration or any other method for separating solids from liquids. The insoluble metal dye salt intermediate may then be further washed of impurities.

The conversion of the metal salts of the dye molecule to the commonly used alkali metal salts such as sodium, potassium, ammonium, etc. is easily accomplished by mixing with corresponding weak acid salts such as carbonate, bicarbonate, phosphate, etc. (e.g., sodium, potassium, or ammonium) which will form an insoluble metal salt of the weak acid and release the soluble alkali metal salt of the dye. In certain instances where a soluble free acid form of the dye is desired, treating the metal salt with sulfuric acid will release the dye in solution, forming an insoluble metal sulfate (such as calcium or barium sulfate). The dye is recovered in almost pure form by simple filtration or any other method for separating solids from liquids. If removal of any residual metal ions is critical for the intended use, this can be easily accomplished by passing the dye solution through a strong cation exchange resin. In the case of xanthene dyes, this may also be accomplished by acid treatment, conversion to the corresponding fluoran dye, followed by formation of the required salt by careful acid base titration. The dye may also be mixed with activated carbon and filtered to further remove any unsulfonated intermediates.

In general, using the method taught by the present invention, it is possible to obtain dyes within the following ranges of purity:

| | |
|---|---|
| Minimum Dye Content | >90% |
| Water soluble organic impurities [that form soluble metal-salts such as quinaldine sulfinic acid or sulfonated phthalic acid] | <0.1% |
| Residual Metal Ion [$Ca^{2+}$, $Ba^{2+}$, $Al^{3+}$, etc.] | <200 ppm |

In the purification of D & C Y10, the mole ratio of calcium chloride/ aluminum chloride or aluminum sulfate added to water solubilized dye to form an insoluble dye salt is preferably in the range from about 0.5 to about 10, more preferably from about 0.5 to about 3, most preferably from about 0.5 to 1.0.

In the purification of D & C Y10, formation of the insoluble calcium or aluminum dye salt intermediate occurs in the range of 15° C. to about 90° C., more preferably from about 20° C. to about 70° C., most preferably from about 35° C. to 60° C.

As used in the purification of D & C Y10, approximately 99% of the total theoretical amount of the insoluble calcium or aluminum dye salt intermediate is produced between 0.5 hours and 2 hours.

In the purification of D & C Y10 by formation of an insoluble calcium or aluminum salt intermediate, it is possible to obtain D & C Y10 dyes of the following purity:

| | |
|---|---|
| Minimum Dye Content | >90% |
| Water soluble organic impurities [that form soluble metal salts] | <0.1% |
| Disulfonated subsidiary dyes* | <2.0%, more preferabley <1.0% |
| Residual $Ca^{2+}$ or $Al^{3+}$ | <100 ppm |

*Applicable only to calcium salt.

Similar but less efficient purification can also be achieved by the use of manganese or magnesium salts (chloride, sulfate etc.) to precipitate D & C Y10 as the insoluble dye salt.

In another embodiment of the present invention, barium chloride is used to purify predominantly disulfonated dye (E104). In the purification of E104, the mole ratio of barium chloride added to water solubilized dye is preferably in the range from about 0.5 to about 10, more preferably from about 0.5 to about 3, most preferably from about 0.5 to 1.0. Formation of the insoluble barium dye salt intermediate occurs in the range of 15° C. to about 90° C., more preferably from about 20° C. to about 60° C., most preferably from about 35° C. to 50° C. Approximately 85% of the total theoretical amount of the insoluble barium dye salt intermediate is produced between 2.0 hours and 10 hours.

In the purification of E104 by formation of an insoluble barium dye salt intermediate, it is possible to obtain purified dyes of the following specifications:

| | |
|---|---|
| Minimum Dye Content | >90% |
| Water soluble organic impurities [that form soluble metal salts] | <0.1% |
| Trisulfonated subsidiary dyes | <1.0% |
| Residual $Ba^{2+}$ | <100 ppm |

A third embodiment of the present invention include the precipitation of D & C Red 28 with either calcium or barium chloride to purify predominantly the dye free of intermediates and conversion to pure D & C Red 27. In the purification of D & C Red 28, the mole ratio of calcium or barium chloride added to water solubilized dye is preferably in the range from about 0.5 to about 10, more preferably from about 0.5 to about 3, most preferably from about 0.5 to 1.0. The formation of the insoluble calcium or barium dye salt intermediate occurs in the range of 15° C. to about 90° C., more preferably from about 20° C. to about 60° C., most preferably from about 35° C. to 50° C. Approximately 80% of the total theoretical amount of the insoluble calcium or barium dye salt intermediate is produced between 2.0 hours and 10 hours.

In the purification of D & C Red 28 by formation of an insoluble calcium or barium dye salt intermediate, it is possible to obtain purified dyes of the following specifications:

| | |
|---|---|
| Minimum Dye Content | >90% |
| Water soluble organic impurities [Resorcinol, phthalic acid deriv.] | <0.1% |
| Residual $Ca^{+2}$ or $Ba^{+2}$ | <100 ppm |

The present invention offers several advantages over prior art processes. The present invention requires fewer process steps to obtain water soluble dyes of FDA certifiable purity and having a cleaner, brighter shade. The present invention also enables the purification of predominantly monosubstituted dyes from mixtures of di and trisubstituted dyes as well as the purification of disulfonated dye mixtures practically free of trisulfonated dyes. The reagents used in the present purification method are also inexpensive and any waste generated is disposed of or recycled easily. Because amine compounds are not used as reagents in the present purification method, contamination of the product with trace amounts of the amine or solvents used to extract the amine is avoided. This invention enables the isolation of highly water soluble xanthene dyes and thereby the corresponding fluoran dyes, to be isolated as pure salts free of contamination by the process intermediates such as resorcinol, halogenated resorcinol and preferably, the xanthene and fluoran dyes contain less than 0. 1% phthalic acid, less than 0.1% resorcinol, less than 0.1% brominated phthalic acid and less than 0.1% tribromoresorcinol as impurities after purifying such dyes containing at least 0.1% of at least one of those impurities.

The following examples further illustrate the invention. These examples are not intended to limit the invention in any manner.

EXAMPLES

Example 1

Purification of Quinoline Yellow water soluble dye through the formation of an insoluble calcium salt intermediate A. Precipitation as a Calcium Salt 100 grams of solvent yellow 33 (technical grade, approximately 96% purity, greenish yellow granules, manufactured from phthalic anhydride and quinaldine), were sulfonated. The reaction mixture was quenched into a solution comprising 150 grams of calcium chloride in 1500 grams of ice water. The vessel was rinsed with 860 grams of additional water and the calcium salt slurry was mixed overnight. The mixture was heated to 40° C., filtered, and washed with 1412 grams of warm water to yield 669.6 grams of yellow calcium salt cake.

B. Purification of Precipitated Calcium Salt 100 grams of the yellow calcium salt cake produced according to step A above were mixed with 200 grams of water and heated to 60° C. for one hour. The insoluble slurry was filtered under vacuum and rinsed with 100 grams of water. A bright yellow quinoline dye cake, 89 grams, was recovered. This step was repeated to make sufficient yellow quinoline dye cake for step C below.

C. Release of Sodium Salt from Calcium Salt 209 grams of the yellow quinoline dye cake produced according to the method of step B above were suspended in 1.5 liters of water. The slurry was mixed with 20 grams of activated carbon and 45 grams of sodium carbonate for two hours at 42° C. The mixture was filtered. The filtrate was mixed a second time with 10 grams of activated carbon to remove the remaining unsulfonated intermediates and filtered to obtain an FDA certifiable D & C Y10 solution.

Comparative Example 1
Purification using prior art salting out method

A second purification using the prior art method of "salting out" the quinoline dye was performed. 104 grams of solvent yellow 33, 98% purity, were sulfonated. The reaction mixture was drowned in 1995 grams of ice cold brine and filtered after half an hour. 876.0 grams of a yellow cake was obtained.

TABLE I

|  | Example 1 | Comparative Example 1 | FDA Specs. |
| --- | --- | --- | --- |
| % Disulfonic Acids | 0.94 | 13.16 | <15.0 |
| % Sulfonated Quinaldine | 0.03 | 0.73 | <0.2 |

Example 2
Release of Sodium Salt from Aluminum Salt 10 grams of a quinoline dye cake produced similar to the method of step A but using aluminum sulfate as precipitant were suspended in 100 ml of water. The slurry was mixed with 2 grams of disodium phosphate for one hour at 57° C. The mixture was filtered after adjusting the pH from 2.5 to 6.1 with 0.8 grams of soda ash and mixing for an additional two hours with 0.3 grams of activated carbon at 60° C.

Example 3
Purification of E104 disulfonic acid dye via barium salt intermediate A 3.3% dye solution containing a 1:60:39 mixture of tri, di, & monosulfonic dyes was mixed with activated carbon for one hour and then filtered. 20 grams of barium chloride were added to the filtrate which was then mixed for one hour at 40–50° C. A dark green sludge precipitated that was subsequently filtered. Ten additional grams of barium chloride were added to the filtrate to precipitate bright yellow salts of the mono and disulfonic acid dye salts. After two hours of mixing the precipitate was filtered and washed with water. The precipitate was mixed in 300 milliliters of water. 11.75 grams of sodium carbonate were added to the solution to liberate the sodium dye salts. A 1% solution of dye purified according to the present invention appeared bright yellow compared with a 1% solution of the unpurified, original dye solution, which appeared brownish yellow.

Example 4
Purification of xanthene dyes via precipitation as metal salts
Precipitation of D & C Red 28 as calcium salt 50.7 grams of D & C Red 28 (82.9% pure) were dissolved in 250 ml water. The pH of the solution was 9.5. 11.1 grams calcium chloride in 18 grams of water were added to the solution. The mixture was heated to 55° C. and the pH was adjusted from pH 7.5 to pH 10.8 with 50% sodium hydroxide solution. The precipitated calcium salt of the dye was filtered after mixing for 1½ hours at 55 C. The wet cake was reslurried in 400 ml water, heated to 60° C., and filtered hot. The resulting cake was dried and ground to yield 35.7 grams of powder.

Example 5
Purification of xanthene dyes via precipitation as metal salts
Precipitation D & C Red 28 as barium salt 8.2 grams of barium chloride in two equal lots was added to a solution of 20 grams of D & C Red 28 (70.6% pure) in 110 grams water at 60° C. Precipitation was initiated without pH (7.85) adjustment by heating for one hour. The reaction mixture was cooled to about 25° C. and filtered. 22 grams of a dark wet cake was dried and ground to yield 9.5 grams of a light pink powder. The filtration mother liquor was found to contain 1.6 grams (11.3% of the total) of the color.

The color in the water soluble form as the sodium salt was easily regenerated from the above water insoluble metal salts by treatment with soda ash analogous to earlier examples. The 1 % dye solution obtained after the metal salt purification appeared bright red while the unpurified, original dye solution appeared dirty brownish-red.

Example 6
Purification of xanthene dyes via precipitation as metal salts
Purification of Tetrachlorofluorescein via calcium salt A solution of tetrachlorofluorescein (TCF) [2665 g, containing 179 g of TCF] was heated to 70° C. and mixed with 113.95 grams of calcium chloride. The mixture was heated and mixed for approximately one hour or until most of the TCF was precipitated as calcium salt. The dye salt was filtered. The wet cake was reslurried in 1000 ml water, heated to 50° C., and mixed with 46.33 g of soda ash to release the dye as the water soluble sodium salt. The resulting calcium carbonate cake was filtered and the dye solution (1772 g) was then acidified to pH 2.1 with 48.4 g 50% dilute sulfuric acid. The precipitated dye (TCF) was filtered, washed, dried and ground to yield 175.59 grams of powder.

TABLE II

|  | Initial | Final |
| --- | --- | --- |
| % Tetrachlorophthalic acid | 0.15 | 0.05 |
| % Resorcinol | 0.48 | <0.01 |
| % TCF | 86.8 | 85.1 |

*All values measured by High Pressure Liquid Chromatography (HPLC) unless otherwise indicated.

After the above purification, a 0.1% basic solution of the dye (TCF) appeared bright yellow with a slight greenish fluorescence and was transparent. Before purification, a 0.1% solution of the unpurified, original dye solution appeared dark greenish yellow and the solution was opaque.

Although the invention has been described in considerable detail, such detail is for the purpose of illustration only and many variations and modifications can be made by one skilled in the art without departing from the spirit and scope of the invention as described in the following claims.

What is claimed is:

1. A method for purifying a water-soluble dye comprising the steps of:
    A. adding a metal salt to an aqueous solution containing a water-soluble dye and impurities to form a water-insoluble dye salt of the metal in the impurities-containing aqueous solution;
    B. separating the water-insoluble dye salt of step A from the impurities-containing aqueous solution to isolate the water-insoluble dye salt of step A;
    C. contacting the isolated water-insoluble dye salt of step B with an aqueous solution containing an alkali metal, or ammonium, salt to form a water-insoluble salt and an aqueous solution containing purified water-soluble dye; and
    D. separating the purified water-soluble dye from the water-insoluble salt to isolate the purified water-soluble dye.

2. A method for purifying a water-soluble dye as in claim 1 wherein the metal salt of step A is a water-soluble salt of calcium.

3. A method for purifying a water-soluble dye as in claim 1 wherein the metal salt of step A is a water-soluble salt of magnesium.

4. A method for purifying a water-soluble dye as in claim 1 wherein the metal salt of step A is a water-soluble salt of manganese.

5. A method for purifying a water-soluble dye as in claim 1 wherein the metal salt of step A is a water-soluble salt of aluminum.

6. A method for purifying a water-soluble dye as in claim 1 wherein the metal salt of step A is a water-soluble salt of barium.

7. A method for purifying a water-soluble dye as in claim 1 wherein step C comprises contacting the water-insoluble dye salt with an alkali metal, or ammonium, carbonate to form a water-soluble dye salt and a water-insoluble metal carbonate precipitate.

8. A method for purifying a water-soluble dye as in claim 1 wherein step C comprises contacting the water-insoluble dye salt with an alkali metal, or ammonium, bicarbonate to form a water-soluble dye salt and a water-insoluble metal bicarbonate precipitate.

9. A method for purifying a water-soluble dye as in claim 1 wherein step C comprises contacting the water-insoluble dye salt with an alkali metal, or ammonium, phosphate to form a water-soluble dye salt and a water-insoluble metal phosphate precipitate.

10. A method for purifying a water-soluble dye as in claim 1 wherein the water-soluble dye is a quinoline dye.

11. A method for purifying a water-soluble dye as in claim 10 wherein the aqueous solution of step A contains at least 0.1% quinaldine sulfonic acid, at least 0.1% sulfonated phthalic acid or at least 2% disulfonated subsidiary dyes as impurities and the purified water-soluble dye salt of step C contains less than 0.1% quinaldine sulfonic acid, less than 0.1% sulfonated phthalic acid and less than 2% disulfonated subsidiary dyes.

12. A method for purifying a water-soluble dye as in claim 10 wherein the aqueous solution of step A contains at least 0.1% quinaldine sulfonic acid, at least 0.1% sulfonated phthalic acid or at least 1% trisulfonated subsidiary dyes as impurities and the purified water-soluble dye salt of step C contains less than 0.1% of quinaldine sulfonic acid, less than 0.1% sulfonated phthalic acid and less than 1% trisulfonated subsidiary dye.

13. A method for purifying a water-soluble dye as in claim 1 wherein the water-soluble dye is a xanthene dye.

14. A method for purifying a water-soluble dye as in claim 13 wherein the aqueous solution of step A contains at least 0.1% phthalic acid, at least 0.1% resorcinol, at least 0.1% brominated phthalic acid or at least 0.1% tribromresorcinol as impurities and the purified water-soluble dye salt of step C contains less than 0.1% phthalic acid, less than 0.1% resorcinol, less than 0.1% brominated phthalic acid and less than 0.1% tribromoresorcinol.

15. The method for purifying a water-soluble dye as in claim 1, wherein the water-insoluble dye salt isolated in step B is washed with water to remove contaminants.

16. A method for purifying a predominantly monosulfonated species of quinoline dye comprising the steps of:
    A. adding calcium chloride to an aqueous solution containing the dye and impurities to form an insoluble monosulfonated calcium dye salt in the impurities-containing aqueous solution;
    B. separating the water-insoluble monosulfonated dye salt of step A from the impurities-containing aqueous solution to isolate the water-insoluble monosulfonated calcium dye salt of step A;
    C. contacting the isolated water-insoluble monosulfonated dye salt of step B with an aqueous solution containing an alkali metal salt to form water-insoluble calcium salt and an aqueous solution containing purified water-soluble monosulfonated dye; and
    D. separating the purified water-soluble monosulfonated dye from the water-insoluble salt to isolate the purified water-soluble monosulfonated dye.

17. A method for purifying a predominantly disulfonated species of quinoline dye comprising the steps of:
    A. adding barium chloride to an aqueous solution containing the dye and impurities to form a water-insoluble predominantly disulfonated barium dye salt in the impurities-containing aqueous solution;
    B. separating the water-insoluble predominantly disulfonated barium dye salt of step A from the impurities-containing aqueous solution to isolate the water-insoluble predominantly disulfonated barium dye salt of step A;
    C. contacting the isolated water-insoluble dye salt of step B with an aqueous solution containing an alkali metal salt to form water-insoluble barium salt and an aqueous solution containing purified water-soluble disulfonated dye salt; and
    D. separating the purified water-soluble predominantly disulfonated dye salt from the water-insoluble salt to isolate the purified water-soluble predominantly disulfonated dye salt of step C.

18. A method for purifying a water-insoluble fluoran dye comprising the steps of:
    A. adding a base to the dye to form an aqueous solution of the dye in water;
    B. adding a metal salt to the aqueous dye solution of step A to form a water-insoluble dye salt;
    C. separating the water-insoluble dye salt of step B from the aqueous solution to isolate the purified insoluble dye salt of step C;

D. contacting the isolated water-insoluble dye salt of step C with an aqueous solution containing an alkali metal, or ammonium, salt to form a water-soluble purified dye salt of step C E. contacting the water-soluble purified dye salt of step D with an acid to form a water-insoluble purified dye precipitate; and F. separating the water-insoluble purified dye precipitate from the aqueous solution to isolate the purified water-insoluble fluoran dye.

19. A method for purifying a fluoran dye as in claim 18 wherein the pH of the solution of step A is adjusted to at least about 9 to facilitate the formation of the water-insoluble dye salt formed in step B.

20. A method for purifying a fluoran dye as in claim 18 wherein the metal salt of step B is a water-soluble salt of calcium.

21. A method for purifying a fluoran dye as in claim 18 wherein the metal salt of step B is a water-soluble salt of barium.

22. A method for purifying a fluoran dye as in claim 18 wherein the metal salt of step B is a water-soluble salt of aluminum.

23. A method for purifying a fluoran dye as in claim 18 wherein the metal salt of step B is a water-soluble salt of iron.

24. A method for purifying a fluoran dye as in claim 18 wherein the metal salt of step B is a water-soluble salt of zirconium.

25. A method for purifying a fluoran dye as in claim 18 wherein the water-insoluble dye salt isolated in step C is washed with water to remove contaminants.

26. A method for purifying a fluoran dye as in claim 25 wherein the aqueous solution of step A contains at least 0.1% phthalic acid, at least 0.1% resorcinol, at least 0.1% brominated phthalic acid or at least 0.1% tribromoresorcinol as impurities and the purified water-soluble dye salt of step D contains less than 0.1% phthalic acid, less than 0.1% resorcinol, brominated phthalic acid, and less than 0.1% tribromoresorcinol.

27. A method for purifying a water-soluble dye comprising the steps of:

A. adding a metal salt to an aqueous solution containing a water-soluble dye and impurities to form a water-insoluble dye salt of the metal in the impurities-containing aqueous solution;

B. separating the water-insoluble dye salt of step A from the impurities-containing aqueous solution to isolate the water-insoluble dye salt of step A;

C. contacting the isolated water-insoluble dye salt of step B with sulfuric acid to form a water-insoluble metal sulfate salt and an aqueous solution containing purified water-soluble dye; and D. separating the purified water-soluble dye from the water-insoluble salt to isolate the purified water-soluble dye using a method for separating solids from liquids.

28. The method of claim 27 wherein the metal of the metal salt is calcium or barium.

29. The method of claim 27 wherein separating step D comprises filtering.

* * * * *

UNITED STATES PATENT AND TRADEMARK OFFICE
CERTIFICATE OF CORRECTION

PATENT NO. : 5,772,696

DATED : June 30, 1998

INVENTOR(S) : Puthalath Koroth Sujeeth

It is certified that error appears in the above-identified patent and that said Letters Patent is hereby corrected as shown below:

Column 1, line 32, replace "44" with --44--.

Column 1, line 56, replace "Phioxine" with --Phloxine--.

Column 5, line 10, replace "$R_3$" with --$R_5$--.

Column 5, line 53, replace "$R_{8=H], and}$" with --$R_8$ = H], and--.

Column 5, line 64, replace "other than specified" with --*other than specified*--.

Column 8, line 51, after "genated resorcinol" and before "and" add --,-- and after "and" add --phthalic acid.-- and replace "preferably" with --Preferably--.

Signed and Sealed this

Seventeenth Day of November, 1998

Attest:

Attesting Officer

BRUCE LEHMAN

Commissioner of Patents and Trademarks